United States Patent [19]

Watson

[11] Patent Number: 5,114,054
[45] Date of Patent: May 19, 1992

[54] TANK PISTON WITH TEFLON SHEATHED PACKING MEMBER

[76] Inventor: M. Burnell Watson, Box 34, Dorsey, Ill. 62021

[21] Appl. No.: 554,682

[22] Filed: Jul. 19, 1990

[51] Int. Cl.[5] .............................................. B67D 5/42
[52] U.S. Cl. ................................... 222/389; 222/386; 277/34
[58] Field of Search ..................... 222/389, 386, 148; 277/34.3, 34, 226, 138; 138/DIG. 3; 384/15, 32, 42

[56] References Cited

U.S. PATENT DOCUMENTS

| | | | |
|---|---|---|---|
| 1,892,519 | 12/1932 | Schottgen | 222/389 |
| 2,559,564 | 7/1951 | Sperling | 220/46 |
| 3,043,340 | 7/1962 | Rehbock | 222/389 |
| 3,113,705 | 12/1963 | Weitzel | 222/389 |
| 3,203,674 | 8/1965 | Watson | 259/3 |
| 3,321,110 | 5/1967 | Price | 222/389 |
| 3,690,742 | 9/1972 | Sung | 308/3 |
| 3,808,816 | 5/1974 | Lucas | 138/DIG. 3 |
| 3,828,988 | 8/1974 | Berry | 222/389 |
| 3,940,152 | 2/1976 | Fournier | 277/34 |
| 4,178,000 | 12/1979 | Kuttner | 277/138 |
| 4,355,736 | 10/1982 | Schumacker et al. | 222/389 |
| 4,632,281 | 12/1986 | Wold | 222/389 |
| 4,721,235 | 1/1988 | Watson | 222/389 |
| 4,859,121 | 8/1989 | Deysson et al. | 222/389 |

OTHER PUBLICATIONS

McGraw-Hill, Guide to Plastics, 1974, pp. 10-11.

Dr. Brage Golding's, "Polymers and Resins", 1959, p. 391.

*Primary Examiner*—Michael S. Huppert
*Assistant Examiner*—Philippe Derakshani
*Attorney, Agent, or Firm*—Senniger, Powers, Leavitt & Roedel

[57] ABSTRACT

An elongate cylindric tank for transport or for storage in bulk of semisolid and fluid materials, such as grease and oil with an outlet at one end thereof and a generally cylindric piston sized to slide therein and be moved in a direction toward the outlet, thereby forcing the material in the tank through the outlet. The piston includes a piston member, with a circumferential channel adjacent one end thereof, a seal for sealing the piston member against the interior surface of the tank, and a mechanism for holding the piston against canting in the tank while permitting the piston to slide freely in the tank. The seal comprises an elastic annular packing disposed at least partly within and carried by the channel and a circumferential flexible sheath overlying the packing and protecting it. The packing is hollow and expandable by varying the pressure within the packing between atmospheric pressure and a higher pressure wherein the packing expands and presses the sheath in sliding engagement against the internal tank surface thereby to wipe the material therefrom and to seal the piston member relative to the tank. The sheath prevents the material contained in the tank from contacting the packing.

19 Claims, 1 Drawing Sheet

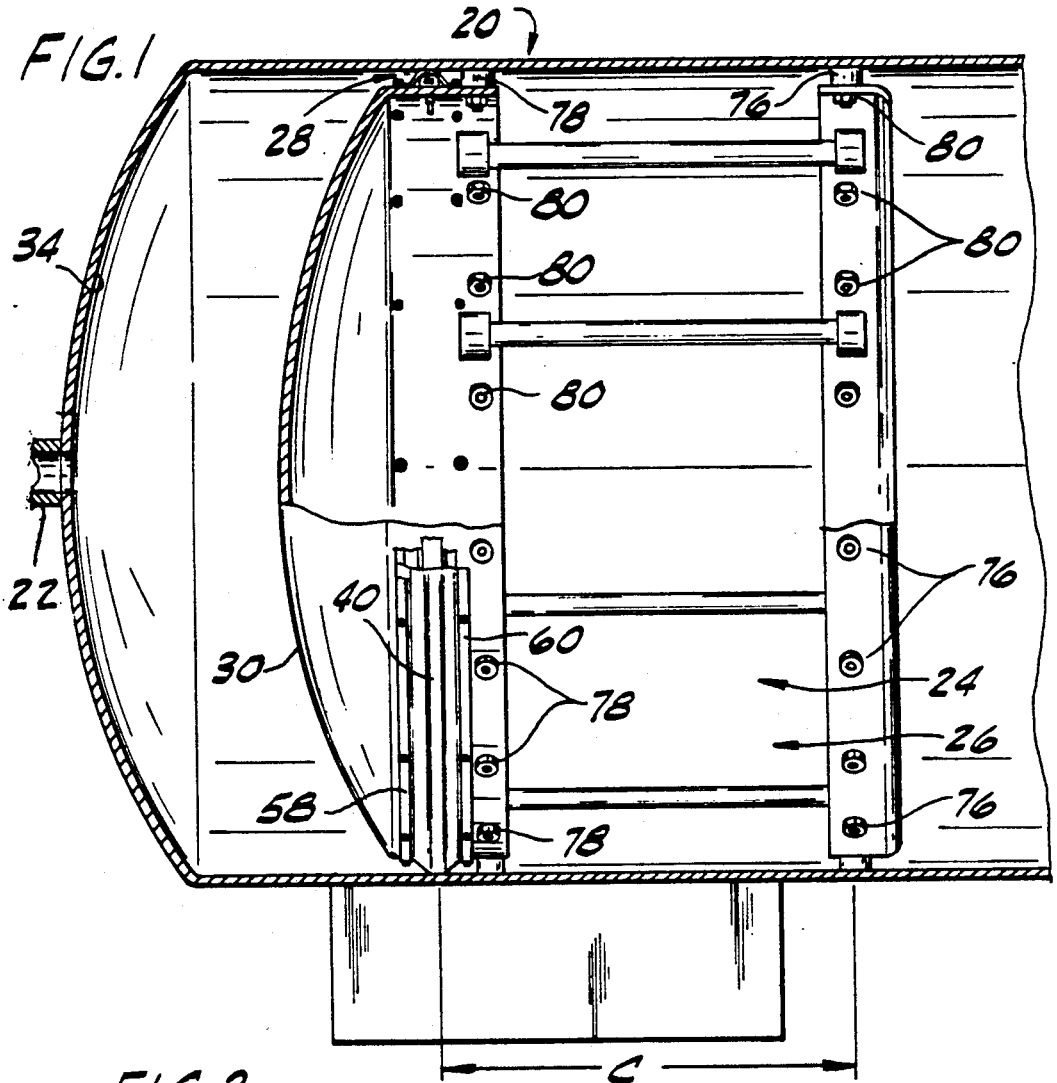
FIG.1
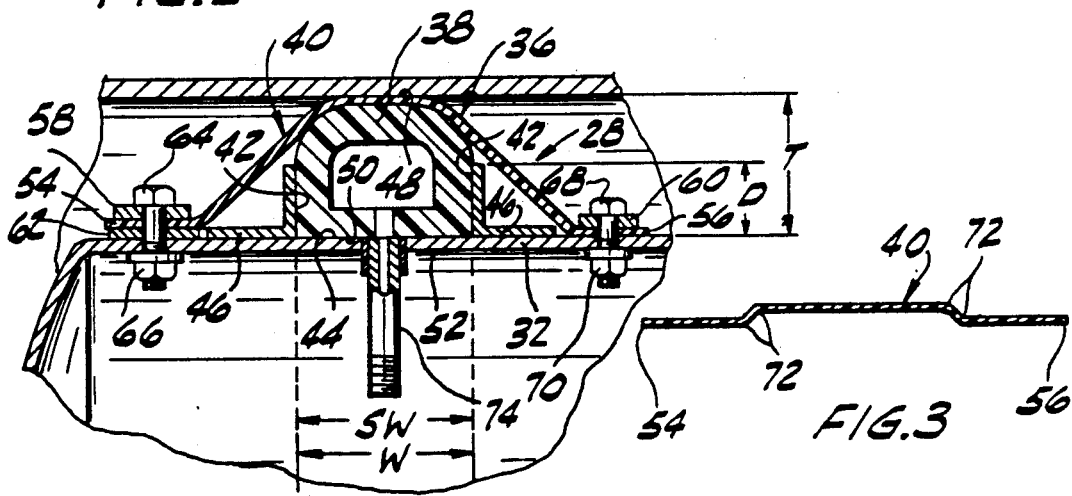
FIG.2
FIG.3

TANK PISTON WITH TEFLON SHEATHED PACKING MEMBER

BACKGROUND OF THE INVENTION

This invention relates generally to a system for transporting or storing semisolid materials, such as grease or ground or comminuted food products, and fluid materials, such as oil or printers ink, in bulk quantities, and more particularly to a tank adapted for quickly and efficiently unloading semisolid or fluid material contained therein.

U.S. Pat. No. 4,721,235 discloses an earlier tank for bulk transport and storage of semisolid materials. The tank has a follower piston with an expandable rubber seal at one end thereof for sealing the piston relative to the tank while accommodating changes in internal cross-section of the tank, and means, such as a plurality of pads fastened to the piston and extending radially outwardly therefrom, for preventing canting of the piston as it moves within the tank.

Although this tank performs well and the seal provides an effective wiping action of the tank interior, some transported materials may attack or react with and cause deterioration of the seal. In the transportation of printers ink, for example, toluene, contained in the ink, will react adversely with and deteriorate many of the synthetic rubbers commonly used for making seals and, consequently, cause the seal to stick to and/or leave patches of a residue on the tank interior. This reaction and deterioration reduces the life of the seal. Even seals fabricated from much more expensive corrosion resistant elastomeric materials such as fluoroelastomers (e.g., VITON®) can be adversely affected by some of the solvents used in printer's ink, rust inhibitors, etc. Further, in some applications, a residue formed by the reaction may contaminate the transported material or, at least, necessitate the manual cleaning of the tank interior.

Moreover, some materials to be transported will, after discharge and during return of the empty tank, dry at the line of contact of the seal and the tank interior and bond the seal to the inner surface of the tank. Such bonding is likely to cause the seal to be torn, abraded or otherwise damaged when the piston is reciprocated. Damage to the seal is likely even though the seal cleanly wipes the inner wall of the tank as the piston moves within the tank.

SUMMARY OF THE INVENTION

Among the several objects of the invention may be noted the provision of a tank for transport and storage of semisolid or fluid materials which has a movable piston or follower with an improved self-cleaning action; the provision of such a tank with an improved seal which is protected from adverse reaction with the material being transported, thereby increasing the life and performance of the seal; the provision of such a tank in which the seal is resistant to bonding with or sticking to the interior surface of the tank; the provision of such a tank which is reliable in operation and relatively simple and inexpensive in construction; and the provision of such a tank which has a piston that is relatively easy to assemble and insert into the tank.

Generally, this invention relates to an elongate tank for transport or for storage in bulk of semisolid and fluid materials, such as grease and oil. The tank is of generally cylindric internal cross section, and has an outlet for the material contained therein at one end thereof. It has a generally cylindric piston sized to slide therein, which is adapted to be moved in a direction toward the outlet, thereby forcing the material in the tank through the outlet The piston has a piston body, a circumferential channel around the body and adjacent one end thereof, and a seal. The seal comprises an elastic annular packing and a circumferential flexible sheath overlying the packing and protecting it. The packing is disposed at least partly within and carried by the channel and covered by the sheath. The packing is hollow and expandable and has pressurizing means for varying the pressure within the seal between atmospheric pressure and a pressure higher than atmospheric wherein the packing expands and presses the sheath against the internal surface of the tank with the pressure such that when the piston slides in the tank the sheath is maintained in sliding engagement with the internal surface thereby to wipe the material therefrom and to seal the piston relative to the tank. The sheath prevents the material contained in the tank from contacting the packing. The piston has means extending radially outwardly beyond the periphery of the piston body and spaced axially from the seal for engagement with the internal surface of the tank for holding the piston against canting in the tank while permitting the piston to slide freely in the tank.

Other objects and features will be in part apparent and in part pointed out hereinafter.

BRIEF DESCRIPTION OF THE DRAWINGS

FIG. 1 is a longitudinal cross-section of the end portion of a tank of the present invention showing a piston, partially broken away to illustrate details, movable within the tank;

FIG. 2 is an enlarged section view of the circumferential seal showing an elastic hollow packing covered by a sheath; and FIG. 3 is an enlarged section view of the sheath prior to installation on the piston.

Corresponding reference characters indicate corresponding parts throughout the several views of the drawings.

DESCRIPTION OF A PREFERRED EMBODIMENT

Referring to the drawings, an elongate tank of the present invention is designated in its entirety by the reference numeral 20. As shown in FIG. 1, the tank has a combination inlet and outlet port 22 at one end (hereinafter designated the forward end for convenience only) for filling and emptying tank 20 with semisolid material, such as grease, or fluid material, such as oil or printers ink.

Tank 20 is of generally cylindric internal cross section throughout its length. A tank designed to be mounted on a semitrailer, for example, may have an internal diameter of approximately 68" (1730 mm) and a length of 42 ft. (12.8 m). Smaller tanks are also made for delivery of the material to a bulk customer for vertical temporary mounting with the forward end down and which, when the contents are consumed, are returned for refilling and reuse. Tank 20 has a generally cylindric piston, designated generally at 24, sized to slide therein and which may be moved in a direction toward the port 22, designated the forward direction (left in FIG. 1), to force the semisolid or fluid material in the tank through the port. For example, the piston 24 may be moved by increased air pressure on its rearward side (right in FIG. 1). The piston 24 may be moved in the rearward direction (right in FIG. 1) either by pumping the material into port 22 or by creating a negative pressure on the rearward side of piston 24 to draw semisolid or fluid material into the tank through the port 22.

The piston 24 includes a piston member 26 and a seal 28. The piston member 26 includes a head 30 at its forward end and a body 32 extending rearwardly of head 30. The piston member 26 may be made of metal or fabricated of synthetic resin. Preferably, the head 30 is configured for complementary engagement with the interior contour 34 of the forward end of tank 20 so that the contained material may be efficiently and completely forced through the outlet (i.e. when the piston head comes into contact with the interior contour, no substantial amount of the material is left in the tank). For example, the head 30 of the piston member may be convex and the complementary interior contour 34 of the forward end of the tank 20 may be concave.

Piston member 26 includes a circumferential channel 36 around the body 32 adjacent the forward end thereof. The seal 28 comprises an elastic annular packing 38 and a circumferential flexible sheath 40 overlying the packing 38 and protecting it. Packing 38 is disposed at least partly within and carried by channel 36 and is covered by sheath 40. Channel 36 is formed between retaining walls 42 projecting from the outer surface 44 of the piston body 32. Specifically, two retaining rings (or angles) designated generally as 46 are spaced apart a distance W (e.g., 2 in. (51 mm)) sufficient to receive the packing 38 and mounted to the piston body (e.g., by welding, bolts, screws, etc.).

Packing 38 is hollow and expandable, and is formed of unreinforced synthetic rubber, such as VITON®, neoprene, or a Buna-N (nitrile) rubber having a hardness, for example, of approximately 65 durometer (Shore A scale). As shown in FIG. 2, packing 38 is generally D-shaped in cross-section with the outer surface 48 being generally arcuate in shape (when unexpanded) and the inner surface 50 generally linear in cross-section to contact the outer surface 44 of the piston body 32 across the bottom 23 of the channel 36. The walls of the packing 38 forming the outer and inner surfaces, 48 and 50, respectively are sufficiently thick (e.g., ⅜ in. (10 mm) for a packing having an overall thickness T of 1-⅝ in. (41 mm) when unexpanded) and strong so that when packing 38 is pressured it will expand to firmly urge the sheath 40 into contact with the interior surface 52 of tank 20 around its entire periphery.

Preferably, the depth D of channel 36 is a substantial portion (e.g., 50-60%) of the thickness T of the packing's cross-section, thereby preventing the packing from expanding longitudinally of the piston body 32 and directing the expansion of the packing in the radially outward direction so that the sheath may be pressed against the interior surface 52 of the tank. In addition, the packing 38 should have a thickness T that is sufficiently greater than the depth D of the channel so that the channel does not interfere with the ability of the seal 28 to accommodate for variations in the internal diameter of the tank and imperfections, such as out of round areas of the tank and dents or "dings", etc., in the internal surface 52 of the tank. Of course, the preferred sizes of the packing 38 and channel 36 change according to the internal diameter of the tank.

The sheath 40 prevents the material contained in the tank from contacting the packing. The sheath 40 may be formed of a sheet of polytetrafluoroethylene, commonly sold under the trademark TEFLON, or any other suitable low friction substance which is substantially non-reactive or inert to the material transported in the tank. Preferably sheath 40 is sufficiently thick (e.g., ⅛") to withstand the forces exerted on it by the packing 38 and the interior surface 52 of the tank. Because the sheath is made of TEFLON®, i.e., a low-friction substance, it is resistant to bonding and sticking to the interior surface of the tank. Thus, it is not likely to tear or abrade during operation.

The sheath has a leading (forward) edge margin 54 and a trailing (rearward) edge margin 56. The sheath 40 overlies both the packing 38 and channel 36 and the edge margins 54, 56 are secured to piston body 28 by first and second tensioned circumferential straps 58, 60, respectively. A circumferential elastomeric gasket 62 is interposed between leading edge margin 54 and the piston body for sealing against material leakage between the sheath 40 and piston body 32. The first strap 58 overlies the outside surface of leading edge margin 54 and is tensioned so that the gasket 62 is tightly compressed between edge margin 54 and piston body 32. A plurality of bolts 64 extend through strap 58, edge margin 54, gasket 62, and piston body 32, and mate with a corresponding plurality of nuts 66. Strap 58, bolts 64, and nuts 66 constitute means for securing the leading edge margin 54 to the piston body. Preferably, nuts 66 are of the self-sealing and self-locking type. The second strap 60 overlies the outside surface of trailing edge margin 56 and is tensioned to tightly compress edge margin 56 and piston body 32 together. A plurality of bolts 68 extend through strap 60, edge margin 56, and piston body 32, and mate with a corresponding plurality of nuts 70 to fix the edge margin 56 firmly against the piston body.

The sheath 40 is made of an elongate strip of ⅛" thick TEFLON® sheet which has a plurality of creases 72 (shown in FIG. 3) parallel to and spaced from the strip's centerline so as to form a shallow channel. The creases 72 permit the sheath 40 to be more easily manipulated during attachment to the piston member. The ends of the strip are abutted and fused together and then finished so that the outer surface of sheath 40 is continuous (i.e., the sheath has no significant transverse seam which would affect sealing against the interior surface of the tank).

As shown in FIG. 2, packing 38 has a valve stem 74, constituting pressurizing means, for varying the pressure within the packing between atmospheric pressure and a pressure higher than atmospheric (e.g., 50–60 psig). Valve stem 74 includes a normally closed valve openable for pressurizing and depressurizing the packing and is accessible through the rear end of the piston member 26. When pressurized, the packing 38 expands and presses sheath 40 against the interior surface 52 of the tank with the pressure such that when piston member 26 slides in the tank sheath 40 is maintained in continuous sliding engagement with the interior surface thereby to wipe the material therefrom and to seal the piston member relative to the tank. Thus, the packing and sheath constitute means for sealing the piston member relative to the tank.

The width SW of the packing 38, when at atmospheric pressure, is substantially that of the width W of the channel so that the packing is prevented from expanding longitudinally of the piston body and will expand radially outwardly to firmly force the sheath against the interior surface 52 when pressurized to higher pressures. In addition, the width SW of the packing 38 is preferably somewhat greater than the unexpanded height of the packing and the packing is D-shaped in cross-section further insuring that it will be stable in the channel as the piston member 26 moves through the tank. For example, the height of the packing at atmospheric pressure may be 1-⅝ in. (41 mm) while the width SW of the seal and the width W of the channel 36 may be approximately 2 in. (51 mm) for a tank having an internal diameter of approximately 68" (1730 mm).

Preferably, the outer diameter of the sheath at its circumferential centerline when packing 38 is unexpanded is substantially the same as the internal diameter of the tank. Sheath 40 and packing 38 are sufficiently flexible when valve 74 is open to facilitate insertion of the piston member 26 into the tank. Packing 38 may then be pressurized so that it presses sheath 40 against the internal surface 52 of the tank to wipe material therefrom and to seal the piston member 26 relative to the tank.

The piston member 26 further comprises a plurality of pads 76, 78 fastened (e.g., by bolts 80 having recessed heads) to piston body 32 and extending radially outwardly therefrom beyond the periphery of the piston body for engagement with the interior surface 52 of the tank to hold the piston body against canting in the tank 20. The pads are of low friction material (e.g., nylon), thereby permitting the piston member to slide freely in the tank. Thus, the pads constitute means for holding the piston 24 against canting in the tank 20 while permitting the piston to slide freely in the tank. There are other equivalent arrangements for preventing canting of the piston such as e.g., a continuous or unbroken circumferential or peripheral radially extending rib instead of the spaced pads.

The pads have a thickness (radially of piston body) somewhat less than one-half of the difference between the diameter of the piston body and the internal diameter of the tank. For example, if the diameter of the Piston body is approximately 64 inches (1630 mm) and the internal diameter of the tank approximately 68 inches (1730 mm), than the thickness of each pad is approximately 1-½ inches (38 mm). Also, the pads may be approximately 3 inches (76 mm) long (axially of the piston body) and 1-½ inches (38 mm) wide (circumferentially of piston body). The nylon pads 76, 78 may be trimmed by a file or sand paper to ensure that the piston member moves freely back and forth.

As shown in FIG. 1, pads 76 are spaced axially of the piston member 26 from the seal 28 a distance C sufficient to prevent canting of the piston (e.g., adjacent the rearward end of the piston body). For example, the pads may be arranged in one circumferential row (i.e. pads 76) around the periphery of the piston body, or they may be arranged in two circumferential rows (i.e. pads 76 and 78) around the periphery of the piston body wherein the second row of pads (i.e. pads 78) are generally adjacent seal 28. Each pad may be spaced within its row at approximately uniform distances from the nearest other pads (e.g., at 30 degree interval around the circumference of the piston body). While two rows of pads are preferred, other arrangements are possible which also prevent canting of the piston 24.

Variations in internal diameter of the tank of ¼ inch (8 mm) or more in a large tank may be accommodated by the pads 76, 78 and seal 28 of this design without significantly reducing the wiping and sealing action of the seal. Thus the seal 28 will apply substantially even pressure to the internal surface of a tank even when the tank is out-of-round, dinged or when it has a varying internal diameter.

In operation, air pressure on the rearward side of the piston body may be increased by introducing compressed air, causing piston member 26 to move forward inside the tank, and thereby forcing semisolid or fluid material through port 22. If desired, the material may be pumped from the tank and the piston will serve as a follower if the rear side of the piston is opened to the atmosphere. The seal 28 wipes the semisolid or fluid material from the internal surface 52 of the tank, thereby causing the tank to be self-cleaning in operation, and the pads 76, 78 hold the piston against canting, thereby preventing jamming and allowing the piston to move at an even speed. Semisolid or fluid material is loaded into the tank by pumping it into port 22 thereby moving the piston member rearwardly (to the right in FIG. 1) and/or by drawing it through port 22 by moving the piston member 26 rearwardly. Fluid materials, such as wastewater, and even semisolid materials, such as grease, have been drawn into the tank by creating a partial vacuum in the tank rearwardly of the piston member 26.

Since the sheath is made of an generally inert substance (i.e., a substance which does not substantially react to the various materials transported, thereby resisting deterioration), the seal has a longer life than a seal without such a sheath. Also, because such a sheath does not react with the material transported, it will not contaminate the material or the tank's interior surface.

It will be observed that another advantage of the tank 20 is its ability to handle food products, such as ground food products (e.g., ground chicken parts). To prepare the tank 20 for food product, the interior of the tank and the head 30 of piston member 26 are steam cleaned by 800 psig (5,500 kPa gage) steam while the piston member is positioned at the rear end of the tank (to the right in FIG. 1), thereby sterilizing the interior of the tank, the head 30 of the piston member and the packing 38 so that food products may be carried. In addition, the piston member 26 is easily removed from the tank for cleaning when more than steam cleaning is desired, and then inserted back into the tank.

It will be observed from the foregoing that the piston member is easily installed in the tank, self-cleaning, and improved in performance, and that the seal resists deterioration.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In an elongate tank for transport or for storage in bulk of semisold and fluid materials, such as grease and oil, said tank having an outlet at one end thereof for the material contained therein, said tank being of generally cylindric internal cross-section, a generally cylindric piston sized to slide in the tank and adapted to be moved in a direction toward said outlet thereby to force material in the tank through the outlet, said piston comprising:

a piston member;

a circumferential channel around the member and adjacent one end thereof;

seal means comprising an elastic annular packing and a circumferential flexible inelastic sheath impermeable to the material overlying the packing and protecting it, said packing being expandable and disposed at least partly within and carried by said channel and projecting outwardly from the outer surface of the cylindric piston in its unexpanded state, the shape of the outer surface of the portion of the packing projecting outwardly from the channel being generally arcuate and the shape and the dimensions of the packing portion within the channel substantially conforming to those of the channel, the packing being at least partly covered by said sheath, said sheath being formed of a substance resistant to bonding to the internal surface of the tank and having at least one preformed circumferential crease therein, said packing being hollow and having pressurizing means for varying the pressure within the packing between atmospheric pressure and a pressure higher than atmospheric wherein the packing expands and presses the sheath against the internal surface of the tank with the pressure such that when the piston member slides in the tank a portion of the sheath is maintained in sliding engagement with the internal surface thereby to wipe the material therefrom and to seal the piston member relative to the tank, said sheath preventing the packing from contacting the tank; and means extending radially outwardly beyond the periphery of the piston member and spaced axially from the seal for engagement with the internal surface of the tank for holding the piston member against canting in the tank while permitting said piston member to slide freely in said tank.

2. In a tank as set forth in claim 1, the sheath having a leading edge margin and a trailing edge margin, said seal means further comprising means for securing the leading edge margin to the piston member.

3. In a tank as set forth in claim 2, the seal means further comprising a gasket interposed between the piston member and the leading edge margin of the sheath for sealing against material leakage between the piston member and the sheath.

4. In a tank as set forth in claim 3, the securing means further comprising a tensioned strap overlying the outside surface of the leading edge margin of the sheath.

5. In a tank as set forth in claim 4, the securing means further comprising a plurality of threaded fasteners extending through the strap and into the piston member.

6. In a tank as set forth in claim 1, the sheath being formed of a substance substantially inert to the material.

7. In a tank as set forth in claim 1, the sheath being formed of polytetrafluoroethylene.

8. In a tank as set forth in claim 1, the sheath being formed of a substance resistant to bonding to the internal surface of the tank.

9. In a tank as set forth in claim 1, the depth of the channel being a substantial portion of the thickness of the packing's cross-section.

10. In a tank as set forth in claim 1, the annular packing being generally D-shaped in cross-section with the outer surface being generally arcuate in shape and the inner surface generally linear in cross-section to contact the outer surface of the piston member across the bottom of the channel.

11. In a tank as set forth in claim 1, the annular packing being formed of unreinforced synthetic rubber.

12. In a tank as set forth in claim 1, said pressurizing means includes a normally closed valve openable for pressurizing and depressurizing the annular packing.

13. In a tank as set forth in claim 12, said annular packing being collapsible when the valve is open thereby to facilitate insertion of said piston member in said tank.

14. In a tank as set forth in claim 12, said annular packing being inflatable, when pressurized, from an unexpanded configuration at atmospheric pressure wherein the outside diameter of the seal means is substantially similar to the internal diameter of the tank and said sheath and said packing are sufficiently flexible to facilitate insertion of said piston member into said tank to an expanded configuration wherein the annular packing expands and urges the sheath against the internal surface of the tank thereby wiping the material from the internal surface of the tank when the piston member slides within the tank and sealing the piston member relative to the tank.

15. In a tank as set forth in claim 1, said means for holding the piston member against canting comprises a plurality of pads fastened to the piston member and extending radially outwardly beyond the periphery of the piston member for engagement with the internal surface of the tank, said pads being arranged in at least one circumferential row around the periphery of the piston member, each pad being spaced within its row at approximately uniform distances from its adjacent pads.

16. In a tank as set forth in claim 15, said pads being arranged in at least two circumferential rows around the periphery of the piston member, a first row of pads spaced axially of the piston member from said annular packing a distance sufficient to prevent canting of the piston member, and a second row of pads being generally adjacent said annular packing.

17. In a tank as set forth in claim 16, said pads being formed of nylon.

18. In a tank as set forth in claim 17, said piston member having a head at said one end thereof, said head being configured for substantial complementary engagement with the interior contour of said one end of the tank whereby material in the tank may be substantially completely forced through said outlet to empty the tank.

19. In a tank as set forth in claim 18, said head being convex and the interior contour of said one end of the tank being concave.

* * * * *